Sept. 28, 1926.
C. ARENS
1,601,099
POWER TRANSMITTING DEVICE
Filed Jan. 24, 1923
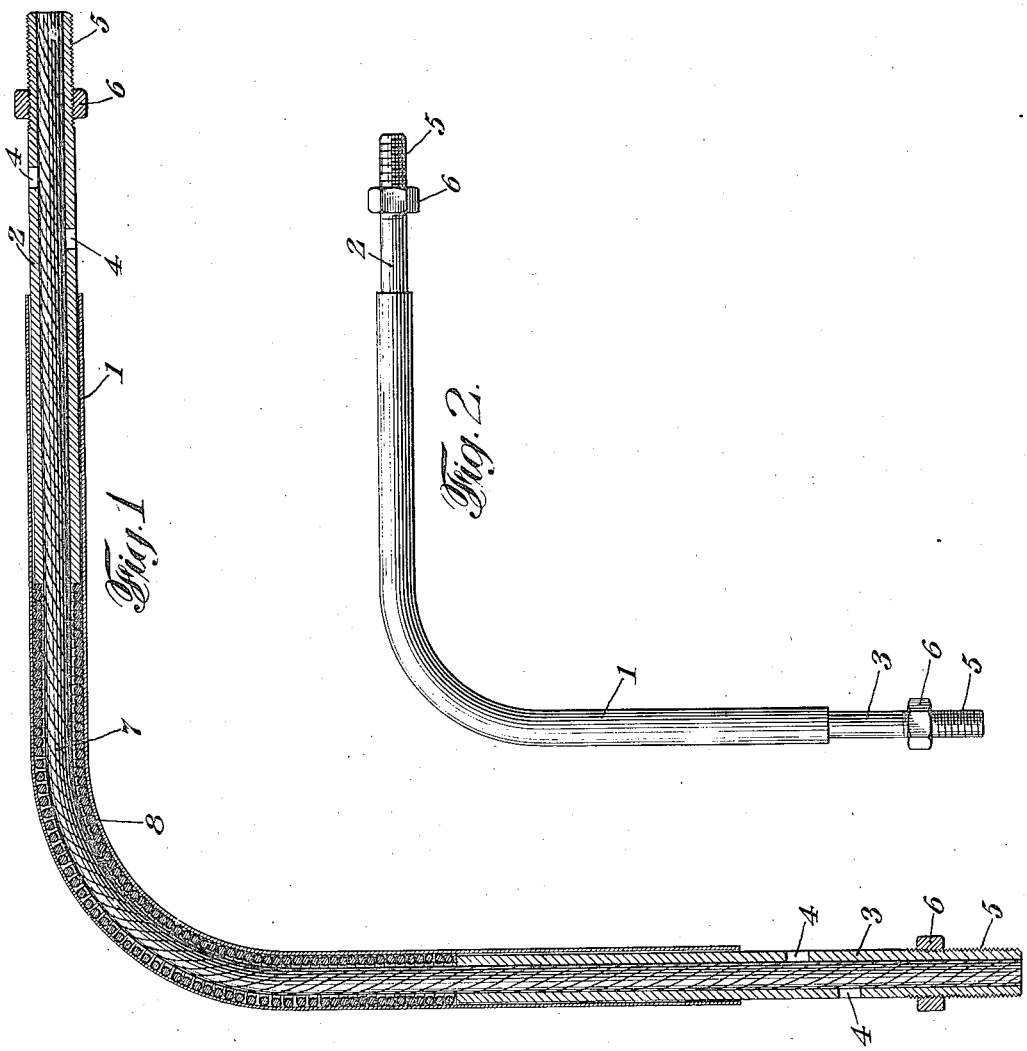
INVENTOR
Charles Arens
BY his ATTORNEYS
Prindle, Wright, Neat and Bean Patented Sept. 28, 1926.

1,601,099

UNITED STATES PATENT OFFICE.

CHARLES ARENS, OF COLLEGE POINT, NEW YORK.

POWER-TRANSMITTING DEVICE.

Application filed January 24, 1923. Serial No. 614,573.

This invention relates to a power transmitting device for transmitting power in an angular direction and it relates more particularly to a device with which torsional, tensile and compressive forces may be transmitted in an angular direction.

The invention has as an object the provision of a device which will be capable of transmitting in an angular direction a torsional force or a tensile force or a compressive force. A further object is to so arrange the apparatus that it may transmit a torsional and a tensile force simultaneously or in succession, and also a torsional and a compressive force simultaneously or in succession. A still further object is to devise an apparatus which will be capable of transmitting a torsional force in an angular direction through a fixed or rigid casing. Other objects will be apparent from the following description and claims.

A preferred embodiment of the invention is shown in the accompanying drawings in which—

Figure 1 represents a section of the device through the ends and the angular turn thereof, and Figure 2 represents a plan view or an outside view of the entire device as assembled.

In said drawings there is shown an outer casing 1 of rigid material such as iron or brass, and this is bent or formed to extend in an angular direction, as shown, the angle in this case being 90°. In the ends of this casing are inserted tubes 2 and 3 which contain solder holes 4 for the purpose of inserting solder and which have screw threads 5 on the ends thereof to hold nuts 6. A flexible cable 7, which may be made of coil wire, is inserted inside of the tubes and the casing 1 and soldered to the tubes by means of the solder holes 4. Between the ends of the tubes there is inserted a spiral spring 8 which is compressed before insertion so as to exert an outward pressure upon the ends of the tubes 2 and 3.

This device may be operated to transmit a rotary or torsional force applied at either end of the casing on the members 2 or 3 and in this case this force will be transmitted by the cable or wire 7, and also by the spring 8 which is preferably attached to the ends of the tubes 2 and 3. When a tensile force is applied on either members 2 or 3 the force is transmitted principally through the cable 7, and when a compressive force is applied on either of the members 2 or 3 it is transmitted principally through the spiral spring 8 as the latter, being under compression already, will not need to be compressed to any appreciable degree before transmitting the force. The rigid character of the casing 1 enables these operations to be easily conducted as there is no yielding under the strain produced.

The angle of transmission may be any desired angle from a few degrees up to 180°, thus including the special case of a straight line. The casing 1, as before stated, is preferably rigid but it may also be made of yieldable material for special uses. It is, however, advantageous to have it rigid and it has been so claimed in certain claims. The spiral spring 8 is preferably compressed before insertion and preferably attached to the tubular members. In cases where it is not desired to transmit compressive forces this spring might be omitted. The cable 7 is preferably inserted within the tubular members but may be otherwise attached and is particularly advantageous for transmitting tensile forces. When transmitting compressive forces this cable 7 might, if so desired, be omitted.

The above described preferred embodiment is particularly advantageous in transmitting torsional, tensile and compressive forces by means of the same instrument and it is so constructed as to simultaneously transmit the torsional and tensile force or the torsional and compressive force. The internal friction inside of the casing may be reduced by oiling so as to present no resistance to movement of the parts and there are no obstructions to be found inside of the structure which would impede movement. It will, therefore, be apparent that this apparatus, when constructed to contain the spiral spring and the cable within a rigid casing, is capable of transmitting by suitable torsional, tensile and compressive forces without running the risk of damaging or breaking any of the parts. The spring, which is designed to bear the greater part of the compressive force when applied, is practically out of operation when a tensile force is applied, the cable taking up the strain in the latter case. When torsional forces are applied both parts will cooperate in transmitting the forces although the spiral spring may be disconnected so that the load is thrown upon the cable if so desired.

While I have described my invention above in detail I wish it to be understood that many changes may be made therein without departing from the spirit of the same.

I claim:

1. A power transmitting device for transmitting torsional and tensile force in an angular direction consisting of a casing of angular form, members within the ends of the casing, and a flexible connection between said members for transmitting torsional power, the inside of the casing presenting no obstructions against endwise movement for the transmission of tensile force when a torsional force is applied to one of the said members.

2. A power transmitting device for transmitting torsional and tensile force in an angular direction consisting of a rigid casing of angular form, members within the ends of the casing, and a flexible cable between said members for transmitting torsional and tensile force.

3. A power transmitting device for transmitting torsional and tensile force in an angular direction consisting of a rigid casing of angular form, members within the ends of the casing, and a flexible cable between said members for transmitting torsional and tensile force inside of the casing the latter presenting no obstructions to endwise movement when a tensile force is applied to one of the said members.

4. A power transmitting device for transmitting torsional and tensile force in an angular direction consisting of a rigid casing of angular form, members within the ends of the casing, a flexible connection between said members for transmitting a torsional and tensile force, the inside of the casing presenting no obstructions to endwise movement when a tensile force is applied to one of the members.

5. A power transmitting device for transmitting power in an angular direction consisting of a casing of angular form, movable members within the ends of the casing, a flexible connection between said members for transmitting torsional power, the inside of the casing presenting no obstructions to endwise movement when a tensile force is applied to one of the said members, and a spiral spring between the ends of the members for transmitting a compressive force.

6. A power transmitting device for transmitting power in an angular direction consisting of a casing of angular form, movable members within the ends of the casing, a flexible connection between said members for transmitting torsional power, and a spiral spring between the ends of the members for transmitting a compressive force.

7. A power transmitting device for transmitting power in an angular direction consisting of a rigid casing of angular form, movable tubular members within the ends of the casing, a flexible cable joining said members, a compressed spiral spring around said cable and fastened inside the tubular members, said casing presenting no obstructions to longitudinal movement, whereby there may be transmitted from one of said members either a torsional, tensile or compressive force.

8. A power transmitting device for transmitting power in an angular direction consisting of a rigid casing of angular form, movable members within the ends of the casing, and a spiral spring attached to the ends of the members, designed to transmit a compressive force.

In testimony that I claim the foregoing, I have hereunto set my hand this 8th day of December, 1922.

CHARLES ARENS.